United States Patent [19]

Packo et al.

[11] 4,379,067

[45] Apr. 5, 1983

[54] SELF-SEALING REFRIGERANT

[75] Inventors: Joseph J. Packo, 11000 Onion Creek Ct., Austin, Tex. 78747; Donald L. Bailey, Traverse City, Mich.

[73] Assignee: Joseph J. Packo, Austin, Tex.

[21] Appl. No.: 269,969

[22] Filed: Jun. 3, 1981

[51] Int. Cl.³ .............................................. C09K 5/04
[52] U.S. Cl. ..................................... 252/67; 252/68; 62/298; 106/33
[58] Field of Search ...................... 252/67, 68; 106/33; 62/298

[56] References Cited

U.S. PATENT DOCUMENTS

| | | | |
|---|---|---|---|
| 3,580,939 | 5/1971 | Ceyzeriat | 556/410 |
| 3,608,000 | 9/1971 | Anderson | 264/36 |
| 3,634,560 | 1/1972 | Anderson | 264/36 |
| 4,046,533 | 9/1977 | Olund | 252/68 |
| 4,237,172 | 12/1980 | Packo | 428/63 |
| 4,304,805 | 12/1981 | Packo | 156/94 |

OTHER PUBLICATIONS

Kirk–Othmer, "Encyclopedia of Chemical Technology", 2nd edition, vol. 17, pp. 295–308, and vol. 6, pp. 471–481, ©1965.

*Primary Examiner*—John D. Smith
*Attorney, Agent, or Firm*—Browdy & Neimark

[57] ABSTRACT

Refrigeration fluid compositions for refrigeration and air conditioning circuits include a usual refrigerant fluid together with an organosilane monomer which is capable of sealing leaks in the circuit in both the vapor and liquid phases.

16 Claims, No Drawings

SELF-SEALING REFRIGERANT

FIELD OF INVENTION

The present invention relates to sealing leaks in air conditioning and refrigeration circuits and the like and, more particularly, to self-sealing refrigerant compositions. The invention is related to the inventions of U.S. PAT. NO. 4,237,172 and U.S. applications Ser. No. 169,478 filed July 15, 1980, now U.S. PAT. NO. 4,304,805 and Ser. No. 217,412 filed Dec. 11, 1980, now U.S. PAT. NO. 4,331,722.

BACKGROUND OF INVENTION

In an article in the Federal Register, Vol. 45, No. 196, Oct. 7, 1980, entitled "Ozone-Depleting Chlorofluorocarbons; Proposed Production Restriction" by the Environmental Protection Agency, it is indicated that the amount of chlorofluorocarbons (CFC) emissions is of great concern to the environment, particularly with respect to its potential for ozone depletion. The problem is of such potential significance that even the banning of CFC has been considered.

CFCs are synthetic compounds which were developed in the 1930's. They are stable, non-flammable, and relatively non-toxic, which make them highly desirable from a worker and consumer safety standpoint. They are used in many applications because of their energy efficiency. Major CFC uses include use in air conditioning and refrigeration circuits, as well as for the freezing of foods.

Quite apart from future growth in the economy and in the refrigeration industry, CFCs currently have an immense economic impact on the U.S. economy, and the industry provides a substantial work force. Thus, based on statistics presently available, about 500 million dollars worth of CFCs are used annually; more than 780 thousand jobs are directly related to CFC usage; approximately 260 thousand domestic businesses, mostly small businesses, use CFCs; the total value of goods and services that depend on CFCs exceed 28 billion dollars annually; the installed value of products that use CFCs is more than 135 billion dollars. In addition, CFCs are the basis of a major U.S. export market that would be jeopardized by restrictions on CFC usage because of emissions (leakage) of CFCs.

One of the major problems in existence relating to the use of CFCs is the leakage of the CFCs from refrigeration and air conditioning units. It can be easily seen that if restrictions were imposed because of such leakage, the impact on the economy would be enormous. However, even without a ban on the use of CFCs, a substantial economic loss is caused by the leakage and consequent replacement of CFCs in air conditioning and refrigeration systems. Moreover, there is a further economic loss because of additional demand of electrical energy caused by inefficient operation of cooling and refrigeration systems from which CFCs have leaked and have not been replaced. In this latter regard it has been estimated that if CFCs were banned, the adverse energy impact, caused by the inefficient operation of refrigeration and air conditioning units, would be equivalent to nearly 240 million barrels of oil by 1990, a figure which constitutes about 45% of current annual production from Alaska's North slope, or about 10% of the total United States crude oil imports in 1978.

In addition to the problems caused by refrigerant leakage as noted above, there are other known disadvantages including the inconvenience and cost of replacing refrigerant from a circuit from which it has already leaked. These problems exist not only relative to the use of CFCs as refrigerants, but also to all other refrigerant fluids. It is, accordingly, clear that it would be desirable to eliminate leakage of refrigerant fluids from air conditioning and refrigeration systems.

SUMMARY OF INVENTION

It is, accordingly, an object of the invention to overcome deficiencies in the prior art, such as indicated above.

It is another object of the present invention to prevent or at least inhibit leakage of refrigerant fluids from refrigerating and air conditioning circuits.

It is a further object of the invention to provide self-sealing refrigerant compositions.

It is yet a further object of the invention to provide self-sealing refrigerant compositions embodying the sealants of U.S. Pat. No. 4,237,172 and applications Ser. No. 169,478 and 217,412.

It is still another object of the invention to provide self-sealing refrigerant concentrates comprising relatively large quantities of the volatile or volatilizable sealant.

In accordance with the present invention small leaks in refrigeration or air conditioning circuits are sealed by incorporation into the refrigeration fluid, which may be any refrigerant, of small quantities of volatilizable or volatile organosilanes, desirably of the types set forth in U.S. Pat. No. 4,237,172 and applications Ser. No. 169,478 and 217,412. The organosilane is premixed with the refrigerant and the composition is charged to the refrigeration or air conditioning circuit.

The above-mentioned and other objects of the invention will be more apparent from the following detailed description of various embodiments.

DETAILED DESCRIPTION OF EMBODIMENTS

As noted above, the invention is useable in all systems having refrigeration or air conditioning circuits, including commercial, home and automobile air conditioning units; refrigeration and freezing circuits, including home freezers and refrigerators, commercial freezers and refrigerators; etc.

A "refrigerant" as used herein is any liquid substance which, by undergoing a change of phase to the vapor phase, lowers the temperature of its environment because of its latent heat. The instant invention can be utilized in conjunction with any refrigerant, the only restriction being that the refrigerant and the vaporizable sealing agent used in conjunction therewith must be inert and compatible with respect to one another. As refrigerants, there may be briefly mentioned the CFCs, including $CCl_3F$ (Refrigerant 11), $CCl_2F_2$(Refrigerant 12), $CClF_3$(Refrigerant 13) $C_2Cl_3F_3$(Refrigerant 113), $C_2Cl_2F_4$(Refrigerant 114), $CHClF_2$(Refrigerant 22), Refrigerant 500 (azeotropic mixture of 73.8% $CCl_2F_2$ and 26.2%-$CH_3CHF_2$), Refrigerant 502 (azeotropic mixture of 48.8%-$CHClF_2$ and 51.2% $CClF_2CF_3$), Refrigerant 503 (mixture of 40% by weight $CHF_3$ and 60% $CClF_3$), Refrigerant 31/114 (mixture of 55% by weight $CH_2ClF$ and 45% by weight $C_2Cl_2F_4$), Refrigerant 12/31 (mixture of 78% by weight $CCl_2F_2$ and 22% by weight $CH_2ClF$), such refrigerants being commonly called "Freons"; ammonia, sulfur dioxide; ethyl or methyl chloride; dimethyl ether; and even binary mixtures such as methyl chloride together with dimethyl ether, and carbon dioxide together with nitrous oxide. With regard to the latter mentioned binary mixtures, they were proposed many years ago but were abandoned because one component of the mixture leaks more rapidly than another and when this occurs pressure readings become impossible to interpret; the instant invention solves this particular problem in that it eliminates leakage. It will, on the other hand, be understood that the invention is of particular interest where the refrigerant fluid is a CFC or ammonia, as these are by far the most commonly used refrigerants.

As noted above, the sealant is an hydrolyzable organosilane, most preferably an aminosilane monomer as described in U.S. Pat. No. 4,237,172; a mixture of such an aminosilane monomer with an alkoxysilane, and acyloxysilane or a mercaptosilane as disclosed in copending application Ser. No. 169,478; or an organosilane monomer or mixture of monomers selected from a mercaptosilane, an acyloxysilane, an alkoxysilane in combination with acetic anhydride, or an alkoxysilane in combination with an amine, all as described in copending application Ser. No. 217,412. The contents of U.S. Pat. No. 4,237,172 and application Ser. No. 169,478 and 217,412 are hereby incorporated by reference.

The compositions of the present invention may be provided in a wide range of concentrations, depending on whether the composition is to be used "as-is", as a self-sealing refrigerant or as a concentrate either for addition to an already existing circuit for "make-up" purposes or for addition to a new or empty circuit in combination with conventional refrigerant. Thus, compositions in accordance with the invention may comprise from 100 ppm (parts per million), i.e. 0.01% of organosilane vaporizable sealant to 99% sealant, the remainder being refrigerant fluid. For compositions to be used at or near full strength, the concentration may range from 100 ppm to 10% sealant, preferably 0.5% to 1% sealant, with the remainder being refrigerant. Concentrates may have a wide range of concentration, normally ranging from 5-99% of the vaporizable organosilane monomer.

If desired, small amounts of other additives may also be included, so long as the other additives do not interfere with the capacity of the fluid to act as a refrigerant and do not adversely affect the capacity of the organosilane to carry out its function as sealant. For example, the composition may include, as such an additive, a lubricating oil, or an odoriferous material which serves as a detecting agent or odorant, such as peppermint, or a foul smelling compound such as a mercaptan. One advantage of the use of a mercaptosilane as the sealant, however, is that if it is desired to use an odorant, such a mercaptosilane can carry out this function as well in view of the fact that these compounds have a strong repulsive odor. On the other hand, in view of the fact that the compositions of the invention are self-sealing, the need for an odorant is reduced in comparison with the need in the prior art.

Accordingly, the essential ingredients of the composition are the refrigerant itself and the volatilizable organosilane or mixture thereof, it being necessary that the sealant be inert and compatible with respect to the refrigerant and the equipment used. From a functional point of view, the mixture of the refrigerant and sealant must be capable of sealing external leaks in the piping of the circuit, both in the vapor phase and liquid phase portions of the circuit. Not all of the organosilane sealants are compatible with all refrigerant fluids; for example, the acyloxysilanes, including acetoxysilane, are not compatible with ammonia.

The organosilane sealants referred to above and utilizable in the instant invention are of a type in which the sealant, upon escape through a leak into the ambient environment, reacts with oxygen and/or moisture present in the environment to form a seal at the site of the leak. Essentially the organosilane compound hydrolyzes and/or polymerizes, either from the vapor or liquid state, to form a silicone polymer or polysiloxane seal at the leak site. It will be understood that, in view of its usage, the volatilizable organosilane monomer should be environmentally acceptable, non-corrosive and sufficiently stable so that storage presents little difficulty.

The selection of a particular refrigerant and sealant composition will depend on the type of equipment and the service requirements. The type of refrigerant will be known to those skilled in the refrigerating arts. As noted above, examples of suitable sealants for use in the present invention of the type which react with oxygen and/or moisture present in the ambient environment to form a seal at the site of the leak, and which have a sufficiently high vapor pressure to do so in both the liquid and vapor parts of the circuit, are as follows:

I.—Aminosilanes

Compounds corresponding generally to the following formula, bearing in mind that the alkyl groups designated must be of relatively short chain length or else the aminosilane will not be sufficiently voltile, are particularly suitable:

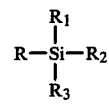

wherein R is H, halogen or R', and R' is alkyl of 1-4 carbons or vinyl;

$R_1$ is halogen, R', —OR', —NHR' or —N(R')$_2$, preferably R' or —OR';

$R_2$ is halogen, R', —OR', —NHR' or —N(R')$_2$, preferably —OR' or N(R')$_2$; and $R_3$ is —NHR' or —N(R')$_2$, preferably —N(R')$_2$.

Aminosubstituted silane monomers prepared by reacting primary amines with chlorosilane monomers are included, e.g. where one or more of $R_1$ to $R_3$ is NHR'.

Examples are:

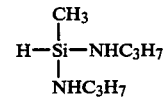

bis(isopropylamino)methylsilane

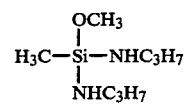

di-isopropylamino methoxy methylsilane.
Generally, however, aminosilanes made from primary amines are less stable than those made from secondary amines, and therefore these monomers are less practical and are not preferred.

Amino-substituted silane monomers containing halogen attached to the silicon atom are also included, e.g. dimethylamino methyl chlorosilane, dimethylamino dimethyl chlorosilane, dimethylamino methyl dichlorosilane, dimethylamino methyl difluorosilane, dimethylamino dimethyl fluorosilane, etc. However, these also are not preferred, particularly where the circuit piping comprises metal, because of their potential to cause corrosion problems, to say nothing of concerns regarding toxicity and environmental impact.

Mixtures of the above compounds may also be used and also mixtures of such compounds with less volatile aminosilanes, so long as the mixture is volatile at the temperatures and pressures of use in the circuit.

Of useful materials which fall within the general formula above, a very effective one is bis-(dimethylamino)-methylsilane

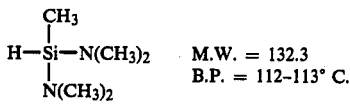

M.W. = 132.3
B.P. = 112–113° C.

Other useful aminosilanes and mixtures thereof are as follows:

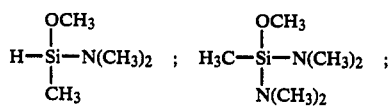

methylmethoxy dimethyl-amino silane

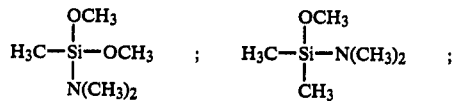

methyl dimethoxy dimethylamino silane ; dimethylmethoxy dimethyl-amino silane

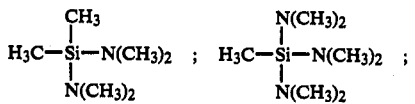

bis-(dimethylamino)dimethylsilane in combination with tris(dimethylamino)methylsilane, the latter being used in quantities of 1–5% of the silane blend; mixtures of the above listed aminosilanes.

II.—Mercaptosilanes

A group of sealants which may be used are thio-esters formed from mercaptans, i.e. mercaptosilanes. Examples are dimethyl bis-(methyl-mercapto)silane; methyl-tris-(methyl-mercapto)silane; and amyl-tris-(methyl-mercapto)-silane.

In general mercaptosilanes and compositions thereof which have the right volatility and form effective seals on hydrolysis and polymerization are as follows:
1. $RSiH(SR')_2$;
2. $RSiH(SR')(OR'')$;
3. $RSi(SR')_3$;
4. $RSi(SR')_2(OR'')$;
5. $RSi(SR')(OR'')_2$, wherein R and R' are hydrocarbon (preferably alkyl) substituents of 1–5 carbon atoms, and R" is $CH_3$— or $C_2H_5$—;
6. mixtures of $R_2Si(SR')_2$ and 1–99 mole % of the mercaptosilanes of (2), (3), (4), and (5) above;
7. mixtures of mercaptosilanes (2) through (5) above;
8. $RSi(SR')_2(NRR_1)$, wherein $R_1$ is a hydrocarbon (preferably alkyl) substituent of 1–5 carbon atoms or hydrogen;
9. $RSi(SR')(NRR_1)_2$;
10. $RSiH(SR')(NRR_1)$;
11. mixtures of $R_2SiH(SR')(NRR_1)$ and 1–99 mole % of the mercaptosilanes of (2) through (5) above or (8) through (10) above;
12. mixtures of (8), (9) or (10) with aminosilanes of the type disclosed in Ser. No. 966,327, or with mercaptosilanes (1) through (7) above.

In the components mentioned above, the R, R' and $R_1$ substituents preferably do not exceed 3 carbons.

The mercaptosilanes can be prepared by synthesis procedures known to those skilled in the art. The following reactions illustrate how they can be made:

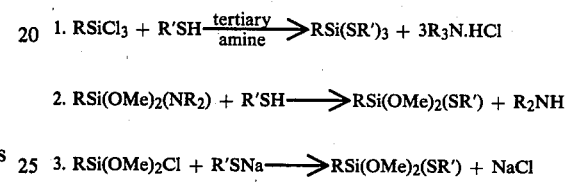

III.—Acyloxysilanes

Acyloxysilanes which function as effective leak sealants are:

1. $RSi(OCR')_3$, where R is a hydrocarbon substituent of 1–5 carbon atoms and R' is methyl or halogen;

2. $RSi(OCR')_2(OR'')$, where R and R' are the same as above and R" is methyl or ethyl;

3. $RSi(OCR')(OR'')_2$;

4. mixtures of $R_2Si(OCR')_2$ and 1–99 mole % of the acyloxysilanes of (1) and (3) above;

5. mixtures of acyloxysilanes (1) through (4) above with mercaptosilanes of the type disclosed above.

Particularly suitable as leakage sealants are formoxysilanes, acetoxysilanes and acyloxysilanes containing both alkoxy- and acetoxy-substituents.

Acetoxysilanes are commercially available and their preparation is well known to silicone chemists. The better reactions are:

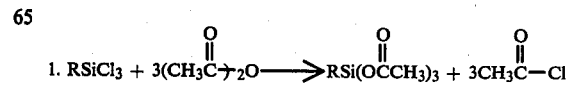

-continued

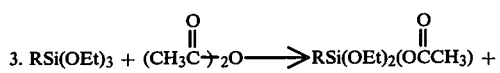

Acyloxysilanes are usable as sealants in environments where their organic acids, e.g. acetic acid, formyl acid, propionic acid, formed upon hydrolysis of the silane, can be tolerated. The acyloxysilanes cannot, however, be used where the refrigerant is NH$_3$.

IV.—Alkoxysilanes and Acetic Anhydride

The use of acetic anhydride-alkoxysilane mixtures can be considered to be an in situ reaction to produce acetoxysilanes which act as the sealant. If corrosion of metal surfaces due to the presence of organic acids (such as acetic acid) is not a problem and/or the refrigerant is not ammonia, then the use of alkoxysilanes in conjunction with acetic anhydride provides an excellent sealant. The alkoxysilanes are readily available and acetic anhydride is a commodity chemical. Mixtures of alkoxysilanes and acetic anhydride react slowly according to the equations:

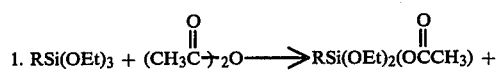

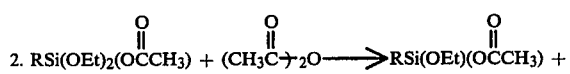

While complete reaction to remove all of the alkoxy substituents will not normally take place except with large excesses of acetic anhydride and/or under conditions of elevated temperatures, nevertheless significant advantages can be obtained over the use of acetoxysilanes, per se. First acetic anhydride-alkoxysilane mixtures are less costly and eliminate a synthesis of the acetoxysilane.

Suitable alkoxysilanes which can be used in conjunction with acetic anhydride as sealants are as follows:
1. RSi(OR')$_3$+acetic anhydride, wherein R and R' are hydrocarbon (preferably alkyl) substituents containing 1-5 carbon atoms or phenyl or phenylethyl;
2. R$_2$Si(OR')$_2$+RSI(OR')$_3$+acetic anhydride;
3. RSiH(OR')$_2$+acetic anhydride.

While the above compositions relate to alkoxysilanes prepared from alcohols with 3-5 carbon atoms, it is preferred that methoxysilanes and ethoxysilanes be employed. The alkoxysilanes are more reactive, not only with acetic anhydride but also with moisture. As a result they would be the most effective as sealants in conjunction with acetic anhydride.

The amount of acetic anhydride used with alkoxysilanes to obtain an effective silane sealant is not critical. Generally, however, it is preferable to use at least one mole of acetic anhydride for each mole of alkoxysilane employed.

V.—Alkoxysilane and Amines

Because amines are weak bases they can catalyze the hydrolysis of alkoxysilanes, especially methoxysilanes, thereby improving their performance as silane sealants. Aminosilanes are highly effective for sealing leaks in natural gas systems and, as pointed out in Ser. No. 169,478 are also effective when used with alkoxysilanes. It is believed that aminosilanes improve alkoxysilanes because the former function as weak bases. Similarly, amines in mixtures with alkoxysilanes also function as weak bases.

The following compositions are pertinent:
1. RSi(OR')$_3$+amine, where R is a hydrocarbon substituent with 1-8 carbon atoms, and R' is methyl or ethyl;
2. RSiH(OR')$_2$+amine;
3. R$_2$Si(OR')$_2$+RSi(OR')$_3$+amine.

The hydrocarbon substituent attached to the silicon atom may contain up to 5 carbon atoms or may be phenyl or phenylethyl which still have adequate volatility and, in the case of methoxy and ethoxysilanes, good reactivity.

The amines which are suitable in conjunction with alkoxysilanes are primary, secondary and tertiary aliphatic amines. Amines with base strengths stronger than ammonia are preferred. A further requirement is that the amine be compatible with the refrigerant and have suffcent volatility in the vapor phase of the circuit. Generally, amines with boiling points below 200° C. meet this requirement. On the other hand, many amines are highly flammable, and it is accordingly preferred to use those which are less flammable, e.g. those which are less volatile, such as diallylamaine, triallylamine, d-n-butylamine, and di-n-amylamine.

The ratio of alkoxysilane to amine employed in the sealing application is not critical. Mixtures of amine to alkoxysilane ranging from 5-90 wt % of each component can be used. However, amine concentrations of 5-30 wt % of the mixture are preferred.

When ammonia is used as the refrigerant, alkoxysilanes, especially methoxysilanes, can be used directly as sealants without amines or other sealant compositions being present. In the presence of moisture ammonia serves to catalyze hydrolysis of the alkoxysilane to a polymeric seal at the site of the leak.

VI.—Aminosilanes and other Organosilanes

The above-described aminosilanes may suitably be used with other organosilanes, such as those also mentioned above, including a wide variety of alkoxysilanes, acyloxysilanes and mercaptosilanes, such as those specifically described above.

Particularly effective has been found to be a mixture of 30 wt % aminosilane, most preferably bis-(dimethylamino)methylsilane, approximately 60 wt % vinyl trimethoxysilane and 10 wt % tetramethoxysilane.

It should be understood that in general the sealant compound or mixture must have the following characteristics: It must be compatible with the selected refrigerant fluid and the materials from which the circuits are formed; it must not interfere to a substantial degree, in the quantity present, with the properties of the refrigerant which make it suitable as a refrigerating fluid; it must exist as a liquid in the liquid portion of the circuit and as a gas in the gaseous portion of the circuit, and must be capable of carrying out its sealing function both in the vapor phase and the liquid phase; it must be a monomer which is capable of hydrolyzing and polymerizing from both the vapor and liquid phases to form a solid silicone polymer or polysiloxane in the presence of moisture and/or oxygen; it should not be a dangerous pyrophoric material; it should be non-corrosive and sufficiently stable so that storage presents little difficulty; it should desirably be environmentally acceptable.

The organosilane sealant and the refrigerant can be mixed in accordance with known technology in the liquid state. The resulting mixture is stored in pressure-resistant containers and is charged to the air conditioning or refrigeration circuit in accordance with known procedures used for charging other refrigerating fluids to such circuits. When charging hydrolyzable organosilane sealant compositions it is important that the system should be dried and free of moisture to prevent premature hydrolysis of the sealant. Where the refrigeration equipment has been open to atmospheric moisture, replacement of the drier in addition to evacuating the system of moisture is good practice. In charging sealant compositions to refrigeration units containing chlorofluorocarbons as refrigerants, slowly add refrigerants, preferably in the liquid state, to insure adquate lubrication of the compressor. Otherwise, the solvent action of the refrigerant can remove oil needed for lubrication of the compressor.

The following examples further illustrate without limiting the nature of the invention.

EXAMPLE 1

A mixture was formed consisting of 99.5% of Refrigerant 12 and 0.5% of an organosilane mixture constituting 30 wt % bis-(dimethylamino)methylsilane, 60 wt % vinyl trimethoxysilane and 10 wt % tetramethoxysilane. The mixture was charged, under pressure, into a conventional can used for charging automobile air conditioning units. The mixture was then discharged from the can into an automobile air conditioning unit from which the original refrigerant fluid had leaked. The automobile air conditioning unit functioned perfectly without leakage.

EXAMPLE 2

Similar to Example 1, a refrigerant composition is prepared for large industrial and commercial systems, including 99.6% Refrigerant 11 and 0.4% organosilane sealant. Useful as the organosilane sealant is methylmethoxy dimethylaminosilane.

EXAMPLE 3

Similar to Examples 1 and 2, a refrigerant fluid mixture of Refrigerant 22 together with 0.1% by weight of organosilane is prepared for home air conditioning units. As the sealant there is used either methyltris(-methyl-mercapto) silane or methyl bis-(methyl-mercapto) silane.

EXAMPLE 4

A concentrate is prepared for commercial freezers and display cases comprising 50% Refrigerant 502 and 50% organosilane. As the organosilane there is used a mixture of 25 wt % of diallylamine and 75 wt % of $CH_3Si(OCH_3)_3$.

EXAMPLE 5

A mixture is formed consisting of 99% of Refrigerant 12 and 1.0% of an organosilane mixture constituting 90% bis-(dimethylamino)dimethylsilane and 10% tris-(dimethylamino)methylsilane. The sealant-refrigerant mixture is charged, under pressure, into a conventional can used for charging automobile air conditioning units. The mixture is then discharged from the can into an automobile air conditioning unit from which the original refrigerant fluid has leaked. The unit functioned satisfactorily without further leakage.

EXAMPLE 6

A mixture of 98% ammonia and 2% ethyltrimethoxysilane is charged to a commercial freezer system which has been leaking. After several hours the system operates without additional leakage.

EXAMPLE 7

Similar to Example 3 a sealant-refrigerant mixture of Refrigerant 22 and 2% by weight of organosilane is prepared for home air conditioning units. As the sealant there is used methyltriacetoxysilane.

It should be noted that the compositions of the instant invention not only seal already existing leaks in air conditioning and refrigeration circuits, when such compositions are added to these circuits, but such compositions also prevent leaks from developing in the sense that very small leaks will be caused to seal as soon as they develop by the escape of sealant and its hydrolysis and polymerization at the sites of the incipient leaks.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology and terminology employed herein is for the purpose of description and not of limitation.

What is claimed is:

1. A leak sealing and leak preventing refrigeration fluid composition for refrigeration and air conditioning units comprising:
    (a) a refrigerant fluid selected from the group consisting of chlorofluorocarbons, ammonia, sulfur dioxide, ethyl chloride, methyl chloride, dimethyl ether, mixtures of methyl chloride and dimethyl ether, and mixtures of carbon dioxide with nitrous oxide;
    (b) a vapor and liquid phase sealant for forming a seal at the site of a leak in an air conditioning or refrigeration circuit, said sealant being an hydrolyzable or polymerizable organosilane or mixture thereof compatible with said refrigerant fluid which does not substantially interfere with the properties of the refrigerant fluid, which exists as a liquid in the liquid portion of the circuit and as a gas in the gaseous portion of the circuit, and which is substantially inert to the material from which the circuit is made, said organosilane sealant being selected from the group consisting of aminosilanes, mercaptosilanes, acyloxysilanes, mixtures of alkoxysilanes with an acidic anhydride or an amine, and mixtures of said aminosilanes and said other organosilanes.

2. A composition according to claim 1, wherein said refrigerant fluid is a chlorofluorocarbon.

3. A composition according to any one of claims 1, wherein said refrigerant fluid is a chlorofluorocrbon or ammonia.

4. A composition according to claim 3 wherein said sealant comprises a mixture of an aminosilane and an alkoxysilane.

5. A composition according to claim 3 intended for use at full strength wherein said organosilane comprises 100 ppm to 10% of said composition, the remainder being essentially said refrigerant fluid.

6. A composition according to claim 5 comprising 0.5% to 1% of said sealant.

7. A composition according to claim 6 in concentrate form comprising 5-99% of said organosilane sealant, the remainder being said refrigerant fluid.

8. A composition according to claim 3, wherein said refrigerant fluid is ammonia and said organosilane is methyltrimethoxysilane.

9. A composition according to claim 3 wherein said sealant comprises a mixture of bis-(dimethylamino) dimethylsilane and tris-(dimethylamino)methylsilane.

10. A composition according to claim 3 wherein said sealant is methyldimethoxydimethylaminosilane.

11. A composition according to claim 3, wherein said sealant comprises a mixture of about 30 wt % bis-(dimethylamino) methylsilane, about 60 wt % vinyl trimethoxysilane and about 10 wt % tetramethoxysilane.

12. A composition according to claim 1, wherein said refrigerant fluid is a chlorofluorocarbon and said organosilane sealant is a alkoxysilane.

13. A composition according to claim 1, wherein said refrigerant fluid is ammonia and said organosilane sealant is selected from the group consisting of said aminosilanes, said mercaptosilanes, said alkoxysilanes in mixture with said amines, and mixtures thereof.

14. A composition according to claim 1, wherein said refrigerant fluid is a chlorofluorocarbon and said organosilane sealant is a mercaptosilane.

15. A composition according to claim 11, in concentrate form comprising approximately 5% of said organosilane sealant, the remainder being said refrigerant fluid.

16. A composition according to claim 15 wherein said acyloxysilane is methyltriacetoxysilane.

* * * * *

UNITED STATES PATENT AND TRADEMARK OFFICE
CERTIFICATE OF CORRECTION

PATENT NO. : 4,379,067
DATED : April 5, 1983
INVENTOR(S) : PACKO et al

It is certified that error appears in the above-identified patent and that said Letters Patent is hereby corrected as shown below:

Column 6, line 56 after "above" insert --;--.

Between lines 56 and 57 of Column 6, insert the following: --6. Mixtures of acyloxysilanes (1) through (4) above --.

Signed and Sealed this

Thirtieth Day of August 1983

[SEAL]

Attest:

GERALD J. MOSSINGHOFF

Attesting Officer

Commissioner of Patents and Trademarks